March 23, 1965 L. R. GENSMAN 3,174,373
TRAVELING SAW APPARATUS
Filed Sept. 10, 1962 3 Sheets-Sheet 1

Lee R. Gensman
INVENTOR.

BY
Ramsey, Kolisch + Hartwell
Attys.

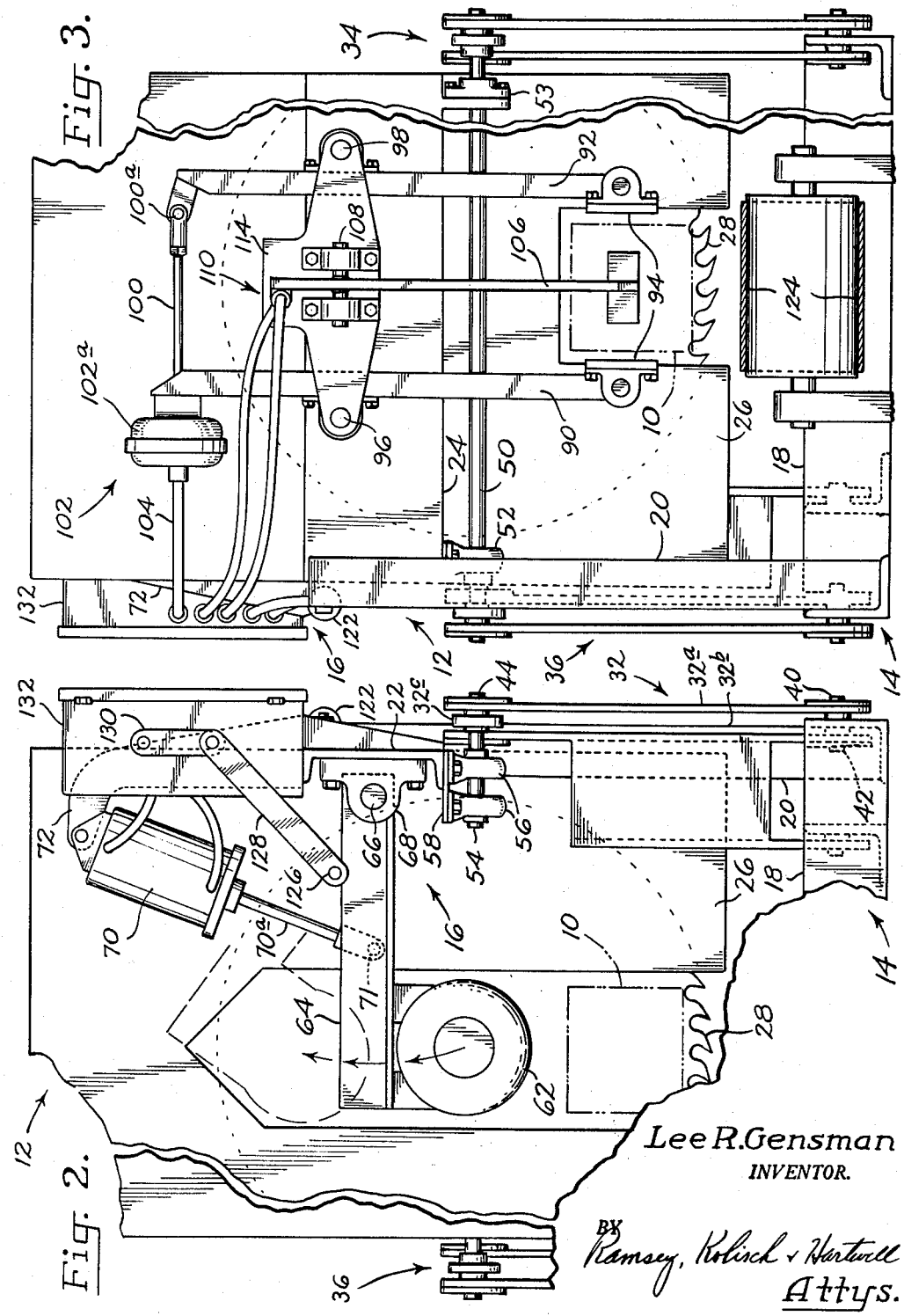

March 23, 1965  L. R. GENSMAN  3,174,373
TRAVELING SAW APPARATUS
Filed Sept. 10, 1962  3 Sheets-Sheet 3

Lee R. Gensman
INVENTOR.

BY Ramsey, Rolisch + Hartwell
Attys.

United States Patent Office 3,174,373
Patented Mar. 23, 1965

3,174,373
TRAVELING SAW APPARATUS
Lee R. Gensman, Portland, Oreg., assignor, by mesne assignments, to L-M Equipment Co. Inc., Portland, Oreg., a corporation of Oregon
Filed Sept. 10, 1962, Ser. No. 222,321
12 Claims. (Cl. 83—110)

This invention relates to apparatus including a traveling or flying cutter, that may be employed to cut a moving ribbon of material into sections of desired length. The invention is characterized by a number of novel features that result in the apparatus being a highly practical and reliable piece of equipment.

A specific and preferred embodiment of the invention concerns apparatus for sawing an elongated continuous ribbon of compacted material, such as compressed ensilage and the like, into sections, with said apparatus including a saw carriage movable with the moving material, and a power-driven saw mounted on said carriage that is shifted across the material during a cutting pass for the saw. While certain features of the invention relate specifically to the cutting of compacted material, other features have a more general application. The description that follows is for the purpose of illustrating the invention, and it is not intended by the description to be limited in all instances to the particular type of material handled.

A convenient way of handling ensilage is to prepare the material into blocks of regular size. With the material in block form, handling and dispensing of the material is facilitated. One method of preparing such blocks is to feed compressed ensilage through an extruding die. The material leaves the die as a ribbon of warm, moist material, having the approximate consistency of sausage. On aging and cooling, the material becomes quite hard and rigid. To prepare blocks from such extruded material, the ensilage is cut while warm, preferable in lengths such as to produce blocks of subtantially uniform weight.

One object of this invention is to provide apparatus for cutting a moving ribbon of material, that includes a carriage movable in a path paralleling the path that the material moves in, and a novel mounting for the carriage whereby frictional resistance to movement is kept at a minimum, and whatever friction is present remains unchanged over relatively long periods of time. The mounting is particularly important in the type of operation briefly described above, in order to remove variability factors that could produce lack of uniformity in the blocks produced.

A related and more specific object is to provide cutting apparatus with such a movable carriage, where the means mounting the carriage is devoid of any exposed rails or runways, that might collect dirt and other foreign matter with such affecting movement of the carriage thereover. Instead of rails or other types of guides, this invention features a pivoted link structure for supporting the carriage where such ling structure produces lineal movement in the carriage as the result of relative shifting of interpivoted members in the structure. Conventional bearing assemblies may be used in the pivot connections required.

Another object of the invention is to provide novel means for gripping or clamping the material during the cutting operation. The gripping means contemplated performs a number of novel functions in the apparatus. For one thing, with the gripping means mounted on the carriage, it may be utilized to fasten the carriage to the material moving through the apparatus, whereby movement of the material may be employed to produce corresponding movement in the carriage. With the gripping means disposed on the off-bearing side of the saw or cutter, when the carriage is moved forwardly independently of the moving material and at a somewhat faster speed, the gripping means may be used as a means for drawing a just-severed piece away from the remainder of the material, so as to free the saw quickly and throw off the just-severed piece onto a suitable conveyor or pile.

Ensilage material is compacted as it flows through an extruding die, and the degree of compaction of the material is subject to some variation. As a means for determining the length of the sections cut, this invention contemplates the provision of a sensing device which engages the lead end of the material as it passes through the apparatus. The sensing device is positioned in front of the saw, a distance approximately equal to the length desired in the blocks cut, and when the device is actuated the saw is shifted in a cutting pass. A sensing device may be provided which penetrates into the material handled with the degree of penetration being related to the degree of compaction of the material. This sinking of the device into the material produces changes in the length of sections cut, dependent upon its degree of compaction. For instance, with less dense material which is lighter, a greater length of material passes beyond the saw before a cut is made than is the case where more compacted and heavier material is handled. As the result of using such a sensing device, blocks of substantially uniform weight are produced with lengths which are slightly varied to compensate for density differences.

Further objects of the invention includes the provision of novel means for supporting the material prior to the cutting thereof, and the provision of a novel system for shifting under power the various movable parts present in the apparatus. In connection with the latter feature, it should be remembered that the conditions under which the apparatus is used freqeuntly are such that electrical motors and relays are undesirable from a safety standpoint. To attain simplicity and maximum safety, and close control over the timing of the part movements, a novel pressure fluid system is provided where air or fluid under pressure powers the motors in the apparatus and proper timing is realized by adjusting valves controlling air flow.

Other objects and advantages will become apparent as the following description is read in conjunction with the accompanying drawings, wherein:

FIG. 2 is an end view, illustrating portions of the feed end (right end) of the apparatus illustrated in FIG. 1;

FIG. 3 is an end view, illustrating portions of the off-bearing end (left end) of the apparatus illustrated in FIG. 1;

Figures 1, 4:
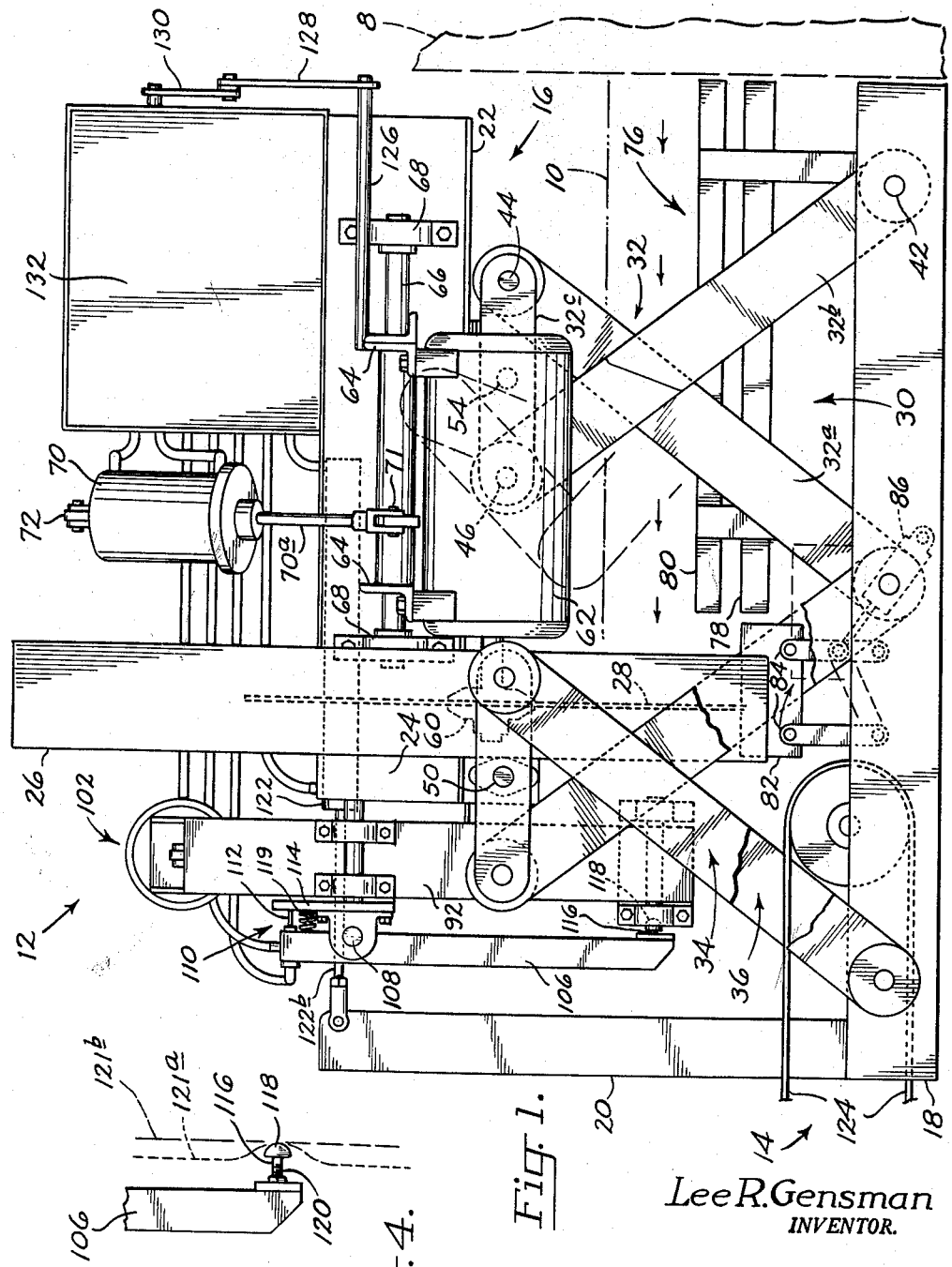
FIG. 1 is a side elevation of apparatus constructed according to one embodiment of this invention, such including a saw carriage mounted for movement on a frame, and a saw mounting movably supported on said saw carriage.
FIG. 4 is an enlarged view of portions of a sensing device provided in the apparatus, showing the operation of the device.

Referring now to the drawings, and first of all more particularly to FIGS. 1, 2, and 3, the apparatus illustrated comprises saw mechanism for cutting extruded ensilage material into sections or blocks, with the material traveling as a continuous moving ribbon of material from the die of an extruding machine. In FIG. 1, such an extruding machine is shown in outline at 8. The machine feeds ensilage material into the apparatus as shown by the dotted and dashed outline for the material indicated at 10.

The saw apparatus through which the ensilage material passes on leaving the extruding machine is indicated generally at 12. The apparatus includes a main supporting frame 14, and positioned generally above the frame a carriage 16.

Frame 14 may take any of a number of forms. As shown, it comprises a rectangular base 18, made up of suitable side and end members. Projecting up from the base and also part of the frame is an upright 20. Upright 20 is located at the left end of the frame in FIG. 1, and as will be hereinafter described, is utilized in producing the movements desired in carriage 16.

Carriage 16 positioned over base 18 of the frame comprises an elongated beam 22 (see FIGS. 1 and 2) extending along one side of the carriage, box-like structure 24 (see FIGS. 1 and 3) joined at one of its ends to beam 22 and extending transversely of the apparatus, and hollow housing structure 26 for housing a saw or cutter 28. Housing structure 26 is secured in a suitable manner to beam 22 and structure 24.

As previously explained, in cutting compacted material such as extruded ensilage, a factor in obtaining uniformity in the sections or blocks cut is the provision of a means movably supporting the carriage where a minimum amount of frictional resistance is offered to its movement, and any resistance to movement that is present remains unchanging over long operating periods. Thus, this invention contemplates a mounting which produces the substantially lineal movement desired in the carriage, with such paralleling the path of travel of the extruded ensilage material, without the use of elongated runways or similar devices that on exposure rapidly collect dirt and other foreign matter with impairment of operation. The construction provided comprises pivoted link structure, indicated generally at 30, now to be described in greater detail.

In the embodiment of the invention illustrated, link structure 30 comprises three pairs of link-connected arms, indicated at 32, 34, and 36. Two of these pairs of arms (pairs 34 and 36) are disposed on opposite sides of the apparatus, adjacent the off-bearing end of the apparatus. The third pair (pair 32) is located on the same side of the apparatus as arm pair 36, but toward the feed end of the apparatus from arm pair 36.

The various pairs of arms are similar in construction. Thus, and with reference to arm pair 32, each may comprise two arms or links 32a, 32b, pivotally connected adjacent their bottom ends and by spaced-apart pivot connections 40, 42, to base 18 of the frame. Interconnecting the upper ends of the arms is a link 32c. Arms 32a, 32b are each pivotally connected to the link, by spaced-apart pivot connections 44, 46, respectively. As may be seen with reference to the dashed outlines for the arms and links in FIG. 1, when the arms are pivoted in a clockwise direction the end of arm 32b lowers and the end of arm 32a raises, and this is accompanied with link 32c assuming a more upright position. While the position of link 32c changes, the center portion of the link moves in a substantially straight path to the left in the figure. It is these center portions of link 32c and the links connecting the other pairs of arms that are utilized in mounting the carriage.

Thus, extending across the apparatus adjacent box-like structure 24, and with ends adjacent arms pairs 34, 36, is a shaft 50. Shaft 50 has its ends joined to the center portions of the links that interconnect the upper ends of the arms in arm pair 34 and arm pair 36. The shaft adjacent its ends is journaled in bearings, such as bearings 52, 53 (see FIG. 3), which are mounted on box-like structure 24. The bearings mounting shaft 50 accommodate rotation of structure 24 and the carriage, relative to shaft 50 and the links, and this movement is about an axis extending transversely of the apparatus that passes through central portions of the links.

Anchoring the feed end of the carriage, to link 32c connecting arms 32a, 32b, is a stub shaft 54. Stub shaft 54 has one end secured to link 32c, and its other end received within bearings 56 fastened to a plate 58 which is secured to the other side of beam 22. Bearings 56 accommodate rotation of the carriage relative to link 32c, about an axis paralleling and laterally to one side of shaft 50.

Using the mounting for the carriage described, it should be obvious that upon the arms in the link structure pivoting to the left in FIG. 1, or in a counterclockwise direction, carriage 16 shifts to the left, with such maintained horizontal and moving in a straight path. This movement parallels the movement of the ensilage material 10 through the apparatus.

Saw or cutter 28 is mounted on a saw arbor 60 driven by a motor 62. Motor 62, in turn, is secured to the underside of a saw mounting 64. Mounting 64 has a shaft 66 joined thereto, and this shaft is journaled within bearings 68 secured to beam 22. The shaft and bearings enable the mounting to shift between the positions shown in solid and dashed outline in FIG. 2, with such movement being accompanied by shifting of the saw between raised and lowered positions.

A fluid-operated ram or motor 70 is provided for shifting the saw mounting between its lowered and raised positions. Ram 70 has its rod end 70a connected by a pivot connection 71 to the saw mounting. The cylinder end 70b of the ram is pivotally supported on carriage 16 through a bar 72 (see FIG. 2).

The material being cut, as it passes through the apparatus, is supported on a guide 76, mounted in a stationary position adjacent base 18 of the frame. Guide 76 includes a base rail 78, and side rails 80 that contact the sides of the material. In front of guide 76 and beneath the saw is a retractable or shiftable support 82, which supports the material under the saw before a cut is made, and which drops down during a cutting pass to allow the saw to complete its cutting pass. Support 82 is mounted on base 18 through pivoted links 84. A double-acting ram or motor 86, interposed between one of the links and the frame, is used to shift support 82 between its raised and lowered positions.

Referring now to FIGS. 1 and 3, gripping or clamping means on the off-bearing side of the saw, comprising a pair of clamping or pincer arms 90, 92, is actuated for the purpose of grasping onto the ensilage material which has passed beyond the saw, and holding the material while it is being cut. In the embodiment shown, clamping or pincer arms 90, 92 have clamping pads 94 pivotally supported on the bottom ends thereof. The arms pivot about pivot connections 96, 98, which pivotally support the arms on box-like structure 24.

Operatively interposed between the upper ends of pincer arms 90, 92 is a rod 100, with an end pivotally connected at 100a to pincer arm 92. Rod 100 is extensible from the housing 102a of an air-operated, diaphragm-type motor 102, upon the admission of air to the motor housing through a hose 104. Housing 102a is mounted on arm 90. With the upper ends of the pincer arms moved away from each other, by extension of rod 100, the lower ends of the arms move together to clamp the material being cut and, conversely, movement of the upper ends toward each other serves to release the material at the lower ends of the pincer arms.

The pincer arms, in addition to functioning as a gripping means for gripping the material being cut, so as to hold it steady, also constitute a means that may be actuated to attach the carriage to the material moving through the apparatus, whereby the moving material is operable to shift the carriage forwardly.

As will be explained, as saw 28 approaches the end of its cutting pass, preferably carriage 16 is advanced forwardly at a slightly faster speed than that the speed at which the material is moving. This serves to draw the block being cut away from the saw, and when the block is completely cut, the forwardly advancing carriage and arms throw the block forwardly out of the cutting station.

A sensing means is provided in the construction, that engages the forward end of material as it passes through the apparatus, and measures off the length of material that is to be cut from the continuous ribbon moving into the apparatus. The sensing means comprises an elongated sensor arm 106, pivotally supported on the carriage through pivot connection 108. The lower end of sensor arm 108 is positioned approximately at the axial center of the material moving toward the arm. Mounted on the upper end of arm 106 is the housing of a valve 110. Valve 110 constitutes a starting valve, and when actuated starts a cycle of operation in the apparatus. The valve includes an actuating member 112 (see FIG. 1) that extends from the right end of the valve housing, as seen in FIG. 1, and that abuts against a plate which is part of the carriage 114. Upon arm 106 swinging in a counterclockwise direction in FIG. 1, the valve housing is shifted to the right, which is accompanied with the actuating member being depressed into the housing to start a cutting cycle.

With compacted material such as extruded ensilage, the compaction of the material is most uniform at the axial center thereof. For this reason, it has been found desirable to start the cutting cycle using sensing means that engages the axial center of the material being cut. The degree of compaction in a given batch of material is subject to some variation, and this affects the weight of the blocks cut. Thus, a device is provided at the end of the sensor arm, which is capable of penetrating into the material when it has a soft consistency, with the amount of penetration depending upon the degree of compaction of the material. As a result, with lightly compacted material, a somewhat longer length of material is cut than in the case of more densely compacted material, and blocks are produced of substantially uniform weight.

More specifically, and referring now to FIGS. 1 and 4, carried at the base of the sensor arm is a projecting stud 116, having a rounded head 118. The stud includes screw threads 120, enabling its position to be adjusted relative to the end of arm 106. As can be seen in FIG. 4, with reference to the line 121a, with soft material, stud 116 penetrates relatively far into the end of the material. With harder material, and with reference to line 121b, the penetration is not so far. With a change in the amount of penetration, a change occurs in the length cut by the saw. A spring, such as spring 119, may be included between the sensor arm and plate 114, which offers resistance to sensor arm 106 swinging out when material moves against the arm.

For shifting the carriage back and forth, a fluid-operated ram or motor 122 is provided. The cylinder end of the motor is secured to beam 22 of the carriage, and the motor includes a rod end 122b (see FIG. 1) connected to upright 20 of the frame, previously described. On contraction of the arm, the carriage is advanced toward the upright, and on extension of the ram, the carriage is shifted to the rear of the upright.

An off-bearing conveyor for removing cut blocks is shown at 124.

The position of the saw is used in controlling sequence of operation in the apparatus. To enable this control by the saw, a rod 126 is connected to saw mounting 64, which extends to the right in FIG. 1, and which is connected by a pair of links 128, 130, to cam structure (to be described) located within a control box 132.

In using the apparatus described, the operation may be as follows: As ensilage material advances beyond the saw, the lead end thereof comes into contact with stud 116 at the base of sensor arm 106. The material then swings the arm outwardly, causing actuating member 112 to move into valve housing 110, which actuates the starting or trigger valve so as to start an operating cycle. When this occurs, the pincer arms come together to grab the protruding end of the ensilage, and the saw starts to move downwardly in a cutting pass. At the same time, shiftable support 82 is moved out of the way of the saw.

On clamping of the material by the pincer arms, the carriage moves forwardly under the urging of the forward-traveling material. As the saw drops and approaches the end of its cutting pass, carriage 16 is advanced at a slightly faster speed than the speed at which the material is moving. This functions to pull the nearly severed product-block away from the remaining work, the pincer arms are separated, and the severed piece held thereby is thrown outwardly and falls on off-bearing conveyor 134. The saw is then raised to its original position, support 82 raised, and the carriage returned, to ready the apparatus for another cycle of operation.

Figure 5:
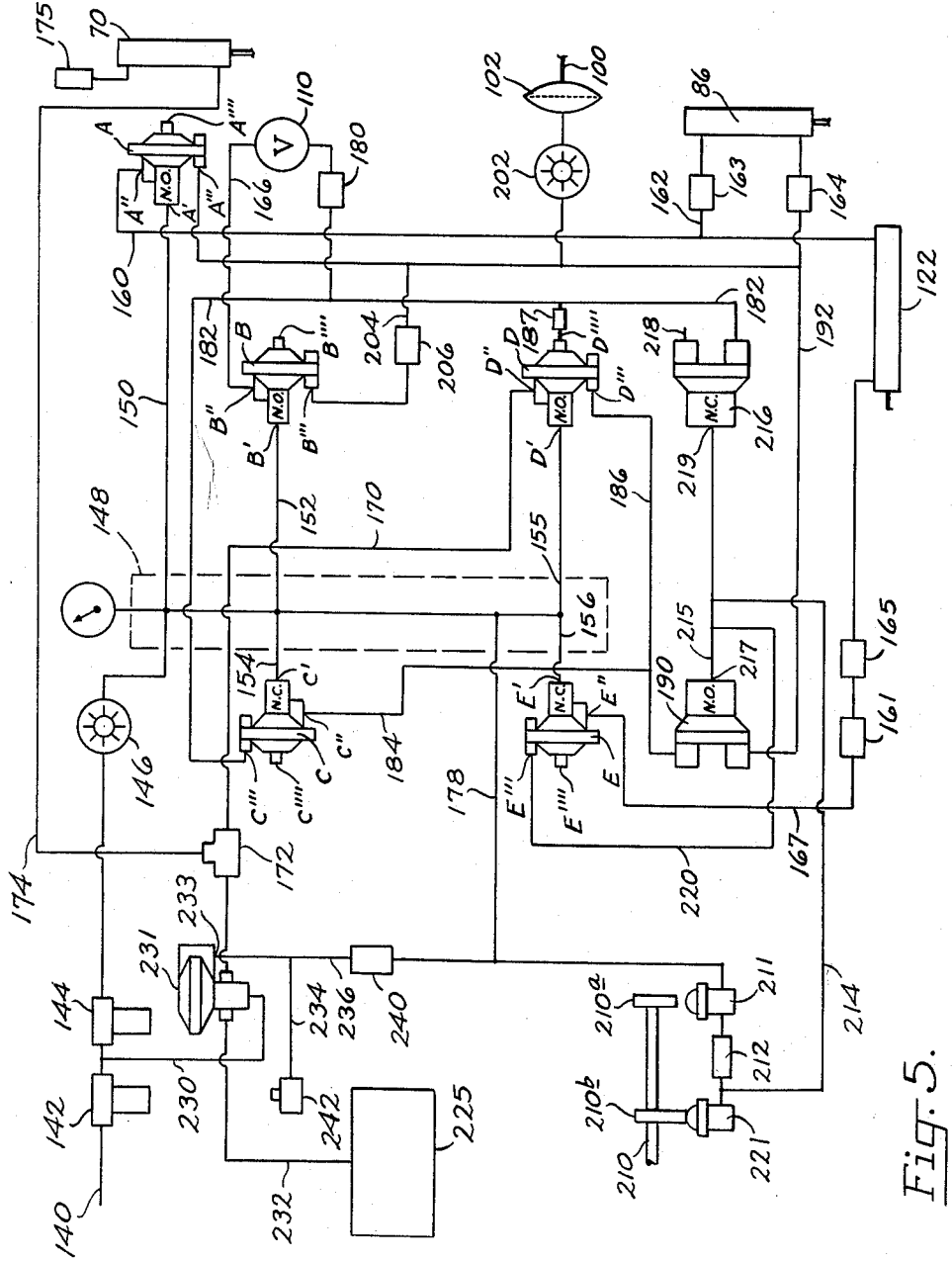
FIG. 5 is a schematic drawing illustrating the pressure fluid system provided for actuating motors in the apparatus, and controlling the operation of these motors.

FIG. 5 illustrates, in diagrammatic form, an air pressure system for operating the various motors, and controlling their operation, whereby the apparatus performs as above indicated, entirely automatically.

Referring now to FIG. 5, air under pressure is supplied to the motors and control parts of the apparatus though a supply conduit 140. This air flows through a filter 142, a lubricator 144, and pressure regulator 146, to a header 148. From header 148, air under pressure flows through a conduit 150 to a normally open valve A, through a conduit 152, to a normally open valve B, through a conduit 154 to a normally closed valve C, and through conduits 155, 156, to a normally open valve D and a normally closed valve E, respectively.

Valves A–E are similar, and are conventional three-way valves. Explaining how the valves operate, each valve has a supply side that air under pressure flows into (indicated for valve A at A′), a controlled side that communicates with the supply side when the valve is open (indicated for valve A at A″), a pilot or operating side to which air under pressure used in adjusting the valve's position is admitted (indicated at A‴ for valve A), and an atmospheric side that connects with the controlled side of the valve to place the controlled side in communication with the atmosphere when the valve is closed and that is shut off from both the valve's supply and controlled sides when the valve is open (indicated for valve A at A″″).

With air under pressure supplied the various valves, as just discussed, air flows from controlled side A″ of normally opened valve A, through a conduit 160, a conduit 162, and a flow-control valve 163, to the head end of ram 86 (connected to support 82) causing the ram to extend and raising of support 82. Trapped air in the rod end of ram 86 is exhausted through a flow control valve 164, a conduit 192, a valve 190, a conduit 184, and valve C, which has its controlled side C″ communicating with its atmospheric side C″″. (Valve 190 is an air-operated two-way valve, that when open connects conduits 192, 184, and that when closed shuts the two conduits off from each other.)

Air also flows through conduit 160 to the head end of carriage travel ram 122, causing this ram to extend and the carriage to position itself as in FIG. 1 in its starting position back from upright 20. Trapped air in the rod end of the ram is exhausted through flow control valves 165, 161, conduit 167, and valve E, which has its controlled side E″ communicating with atmospheric side E″″.

Air under pressure flows additionally from supply side B′ to controlled side B″ of normally open valve B, and a conduit 166, to trigger or starting valve 110, which is a normally closed two-way valve. Further, air flows through conduit 155, from supply side D′ to controlled side D″ of normally open valve D, a conduit 170, a valve 172, and a conduit 174, to the rod end of ram 70 connected to the saw mounting, causing this ram to contract, and the mounting and saw to be raised. Trapped air in the head end of the ram is exhausted through a flow-control valve 175, with valve 175 controlling the raising speed.

On the end of a piece of material passing beyond the saw and against the sensor arm, trigger valve 110 is actuated by movement of the arm with opening of the valve. This results in air under pressure then passing through valve 110, a check valve 180, and a conduit 182, to the pilot side C''' of valve C, which in the construction constitutes the main control valve. With air under pressure admitted to the pilot side of valve C, the normally closed valve opens, and air under pressure flows from supply side C' of the valve to its controlled side C''. With this occurring, air flows through conduit 184 and a conduit 186 to the pilot side D''' of valve D, with this normally open valve closing.

With valve D closed, air is permitted to exhaust from the rod end of ram 70 through conduit 174, valve 172, conduit 170, the atmospheric side D'''' of valve D, and a needle valve 187. With this occurring, the saw mounting is allowed to fall by gravity at a speed controlled by needle valve 187, with the saw starting its cutting pass.

With valve C opened, air under pressure also flows through conduit 184, normally open cut-off valve 190, conduit 192, and flow-control valve 164 to the rod end of ram 86. This causes retraction of the ram, and lowering of support 82. Air under pressure flowing through conduit 192 travels to the pilot side A''' of valve A, causing this valve to close, which connects controlled side A'' of the valve to atmospheric side A''''. With this adjustment, air trapped in the head end of ram 86 is allowed to exhaust through flow-control valve 163, conduits 162, 160, and valve A.

With valve A closed, and valve E still in its original position (closed), carriage travel ram 122 has both ends opened to the atmosphere (its head end through conduit 160 and valve A and its rod end through flow-control valves 165, 161, conduit 167 and valve E). This places carriage 16 in condition to be moved with the traveling ensilage when such material is clamped by the pincer arms.

With opening of valve C, air flows through conduits 184, 192, and a regulator 202 to diaphragm-type motor 102, causing extension of rod 100 and movement of pincer arms 90, 92 toward a position clamping the ensilage.

In addition to the above, with opening of valve C, air flows though conduit 192, a conduit 204, and a flow-control valve 206, to the pilot side B''' of valve B. This actuates the valve to close the valve, whereby conduit 166 that formerly supplied starting valve 110 with air is connected to the atmosphere through atmospheric side B'''' of valve B. With this, the trigger valve is isolated.

On the saw approaching the end of its cutting stroke, links 128, 130 operatively connected to the saw mounting have rotated a rod 210 extending into the control box in such a manner as to actuate a ball-controlled valve 211 through a cam 210a on rod 210. This valve, which formerly was closed, now opens, with air under pressure as a result flowing from header 148, through a conduit 178, valve 211, a check-valve 212, and a conduit 214, and a conduit 215, to the pilot side 217 of cut-off valve 190. This closes the valve, with shutting off of conduit 192 from conduit 184. With valve 190 closed, air under pressure formerly present in conduit 192 is trapped within conduit 192. As a result, ram 86 is held retracted with support 82 in a lowered position. Further, pincer arms 90, 92 are held in a clamping position through motor 102, and valve A is held in a closed position with controlled side A'' communicating with atmospheric side A''''.

Valve 216 is a cut-off valve similar to cut-off valve 190, save that the valve is normally closed. In its normally closed position, conduit 182 is shut off from exhaust conduit 218. Simultaneously with closing of shut-off valve 190, air under pressure is admitted through conduit 214 to pilot side 219 of valve 216. This opens the normally closed valve, and as a result, air under pressure formerly within conduit 182 is allowed to escape through valve 216 and conduit 218. With such occurring, air under pressure leaves the pilot side C''' of valve C, and the valve returns to its normally closed position. With closing of valve C, its controlled side C'' is connected to atmospheric side C'''', and air under pressure is exhausted from conduits 184, 186. This removes air under pressure from the pilot side D''' of valve D, and valve D returns to its normally open position. With valve D open, air under pressure travels from header 148, through the valve, conduit 170, and conduit 174, to the rod end of ram 70, causing the ram to contract and producing raising of the saw mounting and saw.

At the same time that the saw starts to rise, air under pressure in conduit 214 and a conduit 220 enters the pilot side E''' of valve E, opening this normally closed valve. Air under presssre then flows through the valve, conduit 167, and flow-control valves 161, 165, to the rod end of carriage travel ram 122, causing the ram to contract and advancing of the carriage. The ram moves the carriage forwardly at a speed slightly faster than the speed at which the material is moving.

The saw, on rising, shifts cam 210a so as to release valve 211 with the valve closing. Before closing of the valve, enough air under pressure is trapped in conduit 214 to perform the functions above indicated. The saw, on reaching its fully raised position, rotates rod 210 through links 128, 130, so as to cause cam 210b to open normally closed, ball-actuated valve 221. Opening of the valve exhausts trapped air in conduit 214. When this occurs, valve 190 returns to its normally open position, and valve 216 to its normally closed position. This enables air in conduit 192 to bleed out through conduit 184, and the atmospheric opening C''' of closed valve C. This returns the various valves to their original position, and completes an operating cycle.

In the event of a failure in the supply of air under pressure, it is desirable to be able to raise the saw, and thus an emergency air tank 225 is included. With air under pressure present in supply conduit 140, air flows through a conduit 230, a valve 231, and a conduit 232, to the tank, to fill the tank with compressed air. Conduits 234 and 236 are connected to an actuating side 233 of valve 231. Valve 231 normally closes off conduit 232 from valve 172, but when actuated connects the two. With air under pressure in the conduits 234, 236 which would be the normal operating condition (these connecting with conduit 178 through flow-control valve 240), valve 231 operates to cut off the flow of air from conduit 230 to valve 172, conduit 174, and ram 70. If it is desired to raise the saw when it is lowered, valve 242 (a manually operated, normally closed valve) may be actuated to open the valve, causing a reduction in pressure in conduit 234, and adjustment of valve 231 so that air flows from tank 225, or conduit 230 (whichever is at the higher pressure), through valve 231, valve 172 and conduit 174, to ram 70. In the event of a failure in the supply of air under pressure, the pressure of air in conduit 236 drops, also causing an adjustment in valve 231, so that air is fed from tank 225 through valve 231, valve 172, and conduit 174, to ram 70. Valve 172 is a check valve, the function of which it to prevent the flow of air from valve 231 into conduit 170.

It will be seen from the above that the apparatus described includes a number of novel features, contributing to a practical, safe, and efficient type of operation. The carriage moves in a straight path, and this is without the use of rails or guides, which could become encumbered with foreign matter and thus change the freedom of movement of the carriage.

The apparatus may produce successive cuts automatically, with the saw going through a cutting pass and then returning to its original position, each time the sensor arm is actuated.

The blocks, as they are severed from the continuous piece of material, are pulled free of the remainder of the material, and then discarded by the pincer arms on the conveyor, as described above. Until the pincer arms move against the sides of the material, support for the material is provided by the retractable support 82.

The motors are air-operated, and the motors are controlled by means of air valves. There are no electrical connections or relays in the controls, which may introduce a hazardous condition.

The control system selected enables close control over the movements of the parts. The various flow-control valves may be adjusted, with adjustment of these valves changing the rate of air flow in the conduits, and the speed with which the parts have their positions changed.

I claim:

1. In cutting apparatus, a movable carriage with feed and off-bearing ends, a frame, first and second pivotally interconnected link structures pivotally connected to said frame, pivot means pivotally mounting the feed end of said carriage on one of said link structures and pivot means pivotally mounting the off-bearing end of said carriage on the other of said link structures, said carriage being movable in a substantially lineal path on pivotal movement of said link structures, and a cutter supported on said carriage for movement in a direction extending transversely of the carriage's path of movement.

2. In cutting apparatus, a movable carriage, a shaft extending across and mounted on said carriage having opposite ends disposed on opposite sides of said carriage, a frame, support means for said carriage comprising at least three pairs of pivotable arms including a first and a second pair disposed adjacent said opposite ends of said shaft and a third pair spaced laterally to one side of said shaft, the arms of each of said pair of arms being pivotally mounted adjacent their bottom ends on said frame, a link interconnecting upper portions of each pair of arms, means mounting the opposite ends of said shaft on the links interconnecting the arms of said first and second pair of arms, means anchoring said carriage on said third pair of arms, said first and second pair of arms moving said shaft and said third pair of arms moving said anchoring means in a substantially lineal path on pivotal movement of the arms, and a cutter movably supported on said carriage for movement transversely of said path.

3. In mechanism for sawing a continuous substantially horizontal and longitudinally moving ribbon of material into lengths, a frame, a movable carriage supported on said frame for movement in a substantially horizontal path substantially paralleling the path of movement of said material, saw mechanism for cutting the material supported on said carriage and movable during a cutting pass in a direction extending transversely of the carriage's path of movement, clamping means for clamping onto the material mounted on said carriage on the off-bearing side of said saw mechanism, means for actuating said clamping means whereby the moving material is clamped during the cutting of material by said saw mechanism, retractable support means for the material disposed opposite said saw mechanism having a work-supporting position in which said material moves over the support means while supported thereby, and means for retracting said support means from its work-supporting position during a cutting pass for the saw.

4. Apparatus for sawing a continuous substantially horizontal and longitudinally moving ribbon of material into lengths comprising a frame, a carriage supported on said frame for movement in a substantially horizontal path substantially paralleling the path of movement of said material, saw mechanism for cutting the material supported on said saw carriage and movable during a cutting pass in a direction extending transversely of the carriage's path of movement, opposed clamp devices mounted on said carriage on the off-bearing side of said saw mechanism, means for actuating said clamp devices whereby they may be brought together against the moving material during the cutting of material by said saw mechanism, and power-operated means interposed between said frame and carriage for moving the carriage under power in a direction corresponding to the direction in which the material is moving.

5. Apparatus for sawing a continuous moving ribbon of material into lengths comprising a frame, a carriage supported on the frame for movement in a path substantially paralleling the path of movement of said material, saw mechanism for cutting the material supported on said carriage and movable during a cutting pass in a direction extending transversely of the carriage's path of movement, opposed clamp devices mounted on said carriage on the off-bearing side of said saw mechanism, means for actuating said clamp devices whereby they may be brought together against the moving material during the cutting of material by said saw mechanism, power-operated means interposed between said frame and carriage for moving the carriage under power in a direction corresponding to the direction in which the material is moving, means detecting when said saw mechanism approaches the end of its cutting pass, and control means interconnecting said power-operated means and said detecting means whereby said power-operated means is actuated to produce movement of said carriage at a time determined by said detecting means.

6. In apparatus for sawing a continuous moving ribbon of material into lengths, a frame, saw mechanism movable in a cutting pass in a direction extending across said moving ribbon of material, means mounting said saw mechanism on said frame accommodating forward travel of the saw mechanism with the material as the latter is advanced, gripping means for gripping the material disposed on the off-bearing side of said saw mechanism and also mounted for forward travel with the material as the latter is advanced, power-operated means for advancing said gripping means forwardly at a faster speed than the speed at which the material is moving, and means for actuating said power-operated means.

7. In apparatus for cutting a continuous moving ribbon of compressed material, such as ensilage and the like, saw mechanism for cutting the material mounted for movement in a cutting pass across the material, a carriage supporting said saw mechanism movable in a direction paralleling the movement of the material, actuatable means for producing movement of said carriage forwardly together with the material, sensing means engaged by the end of the moving ribbon of material, said sensing means including means for penetrating the material whereby the sensing means is sensitive to the amount of compaction of said compressed material, and control means interconnecting said sensing means and the means for producing movement of the carriage whereby the time that said last-mentioned means is actuated is dependent upon the degree of compaction of the material.

8. In apparatus for sawing a continuous moving ribbon of compressed material such as ensilage and the like into lengths, a frame, a carriage supported on the frame for movement in a path substantially paralleling the movement of the material, saw mechanism for cutting the material supported on said carriage and movable during a cutting pass in a direction extending transversely of the carriage's path of movement, opposed clamp devices mounted on said carriage on the off-bearing side of said saw mechanism and shiftable to a position clamping onto said material, sensing means on the off-bearing side of said saw mechanism for sensing the end of material moving through the apparatus and control means interconnecting said sensing means and said clamp devices whereby the clamp devices are shifted into a position clamping onto said material in response to actuation of said sensing means.

9. The saw mechanism of claim 8, wherein said sensing means includes means for penetrating the material whereby the sensing means is sensitive to the degree of compaction of said compressed material.

10. In saw apparatus for cutting a continuous moving ribbon of material, a carriage, a movable saw mounted on said carriage movable during a cutting pass in a direction extending across said material, clamp mechanism for clamping onto said material mounted on said carriage, a sensor for sensing the end of the material moving through the apparatus, fluid-operated motor means for moving said saw mounting, fluid-operated motor means for actuating said clamp mechanism, and a pressure fluid system for supplying fluid under pressure to said fluid-operated motor means, said system including a supply conduit for the supply of fluid under pressure, a starting valve operatively connected to said sensor to be actuated thereby, and conduit means interconnecting said supply conduit, fluid-operated motor means and starting valve with the starting valve controlling the flow of fluid to said motor means.

11. In apparatus for sawing a longitudinally moving ribbon of material into lengths, a frame, a carriage supported on said frame for movement in a path substantially paralleling the ribbon of material, saw mechanism for cutting the material supported on said carriage and movable during a cutting pass in a direction extending transversely of the ribbon of material, gripping means for gripping the material mounted on the carriage and disposed on the off-bearing side of said new mechanism, and power-operated means for advancing said carriage along its said path at a faster speed than the speed at which the material is moving, said power-operated means comprising extensible means interposed between said carriage and said frame.

12. The apparatus of claim 11, wherein said apparatus further comprises means detecting when the saw mechanism approaches the end of its cutting pass, and control means interconnecting said power-operated means and said detecting means whereby the power-operated means is actuated to produce movement of the carriage at a time determined by said detecting means.

References Cited by the Examiner
UNITED STATES PATENTS

| | | | |
|---|---|---|---|
| 1,412,225 | 4/22 | Winkley | 83—157 XR |
| 1,844,837 | 2/32 | Braun | 83—294 XR |
| 1,944,718 | 1/34 | Rafter | 83—293 |
| 2,287,833 | 6/40 | Ridgway | 83—294 XR |
| 2,641,042 | 6/53 | Kopp | 83—293 XR |
| 2,737,703 | 3/56 | Van Clief | 83—294 XR |
| 2,973,678 | 3/61 | Scott et al. | 83—157 XR |
| 3,066,562 | 12/62 | Barnett et al. | 83—74 |

OTHER REFERENCES

Machine Design, vol. 22, Issue 1, January 1950 (Straight-line Linkages, H. G. Conway, pp. 90–92).

LEON PEAR, *Primary Examiner*.